US008587602B2

(12) United States Patent
Grossman et al.

(10) Patent No.: US 8,587,602 B2
(45) Date of Patent: Nov. 19, 2013

(54) GPU TEXTURE TILE DETAIL CONTROL

(75) Inventors: Mark S. Grossman, Palo Alto, CA (US); Charles N. Boyd, Woodinville, WA (US); Allison W. Klein, Seattle, WA (US); Craig Peeper, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 12/857,280

(22) Filed: Aug. 16, 2010

(65) Prior Publication Data

US 2012/0038657 A1  Feb. 16, 2012

(51) Int. Cl.
*G09G 5/00* (2006.01)
(52) U.S. Cl.
USPC .................. 345/585; 345/582; 345/587
(58) Field of Classification Search
USPC .................. 345/585, 582, 552, 587
See application file for complete search history.

(56) References Cited

U.S. PATENT DOCUMENTS

| 4,509,077 | A * | 4/1985 | Therrien ............... 348/187 |
| 5,230,039 | A | 7/1993 | Grossman et al. |
| 5,831,624 | A * | 11/1998 | Tarolli et al. ............ 345/587 |
| 6,373,482 | B1 * | 4/2002 | Migdel et al. ........... 345/419 |
| 6,501,482 | B1 * | 12/2002 | Rosman et al. .......... 345/587 |
| 7,184,041 | B2 | 2/2007 | Heng et al. |
| 7,538,773 | B1 * | 5/2009 | Hutchins ............... 345/582 |
| 7,554,543 | B2 * | 6/2009 | Aguera Y Arcas ....... 345/428 |
| 7,570,271 | B1 | 8/2009 | Brandt |
| 2007/0127814 | A1 | 6/2007 | Fluck et al. |
| 2007/0171234 | A1 * | 7/2007 | Crawfis et al. .......... 345/587 |
| 2008/0106552 | A1 * | 5/2008 | Everitt ................... 345/552 |
| 2008/0198169 | A1 | 8/2008 | Boyd et al. |
| 2009/0147017 | A1 | 6/2009 | Jiao |
| 2009/0189896 | A1 | 7/2009 | Jiao et al. |
| 2010/0091028 | A1 | 4/2010 | Grossman et al. |
| 2010/0182323 | A1 * | 7/2010 | Nuydens ................ 345/441 |
| 2011/0157206 | A1 * | 6/2011 | Duluk et al. ............ 345/582 |

OTHER PUBLICATIONS

Mittring, Martin, "Advanced Virtual Texture Topics", Chapter 2, Advances in Real-Time Rendering in 3D Graphics and Games Course, The 35th International Conference and Exhibition on Computer Graphics and Interactive Techniques, Special Interest Group on Graphics and Interactive Techniques (SIGGRAPH), Aug. 2008, pp. 23-51, Los Angeles, CA.

Lefebvre, Sylvain, "Unified Texture Management for Arbitrary Meshes", Institut National de Recherche en Informatique et en Automatique (INRIA), May 2004, 20 pages, Montbonnot Saint-Ismier, France.

(Continued)

*Primary Examiner* — James A Thompson
*Assistant Examiner* — Sarah Le
(74) *Attorney, Agent, or Firm* — Vierra Magen Marcus LLP

(57) ABSTRACT

Systems and associated methods for processing textures in a graphical processing unit (GPU) are disclosed. Textures may be managed on a per region (e.g., tile) basis, which allows efficient use of texture memory. Moreover, very large textures may be used. Techniques provide for both texture streaming, as well as sparse textures. A GPU texture unit may be used to intelligently clamp LOD based on a shader specified value. The texture unit may provide feedback to the shader to allow the shader to react conditionally based on whether clamping was used, etc. Per region (e.g., per-tile) independent mipmap stacks may be used to allow very large textures.

16 Claims, 11 Drawing Sheets

(56) References Cited

OTHER PUBLICATIONS

Ephanov, Anton, "Virtual Texture: A Large Area Raster Resource for the GPU", MultiGen-Paradigm, Interservice/Industry Training, Simulation, and Education Conference (I/ITSEC), May 2006, 12 pages, Paper No. 2509.

Makarov, Evgeny, "Clipmaps", NVIDIA, GeForce 8800 Whitepaper, Feb. 2007, 9 pages.

Blythe, David, "Direct3D 10", Microsoft Corporation, ACM Transactions on Graphics (TOG), Special Interest Group on Graphics and Interactive Techniques (SIGGRAPH), Course 3, GPU Shading and Rendering, Jul. 2006, pp. 724-734, ACM, New York, NY, USA.

Segal, Mark, "The OpenGL Graphics System: A Specification", Jul. 25, 2010, pp. 1-518, Version 4.1 (Core Profile), Copyright 2006-2010 The Khronos Group Inc.

"Texture Views (Direct3D 10)", Microsoft, Jul. 2, 2010, website, Z\msft\1411\Related art\texture array direct3d 10.htm.

"Resource Types (Direct3D 10)", Microsoft, Jul. 2, 2010, website, Z\msft\1411\Related art\texture array direct3D.htm.

Dudash, Bryan, "Texture Arrays Terrain Rendering", NVIDIA, Whitepaper, Feb. 20, 2007, 9 pages.

Thomson, Richard Atwater, "Basic Texturing", Chapter 11, The Direct3D Graphics Pipeline, Aug. 13, 2006, pp. 403-468.

Chinese Office Action dated Nov. 22, 2012, Chinese Application No. 201110246458.1, filed Jul. 18, 2011, 14 pages.

\* cited by examiner

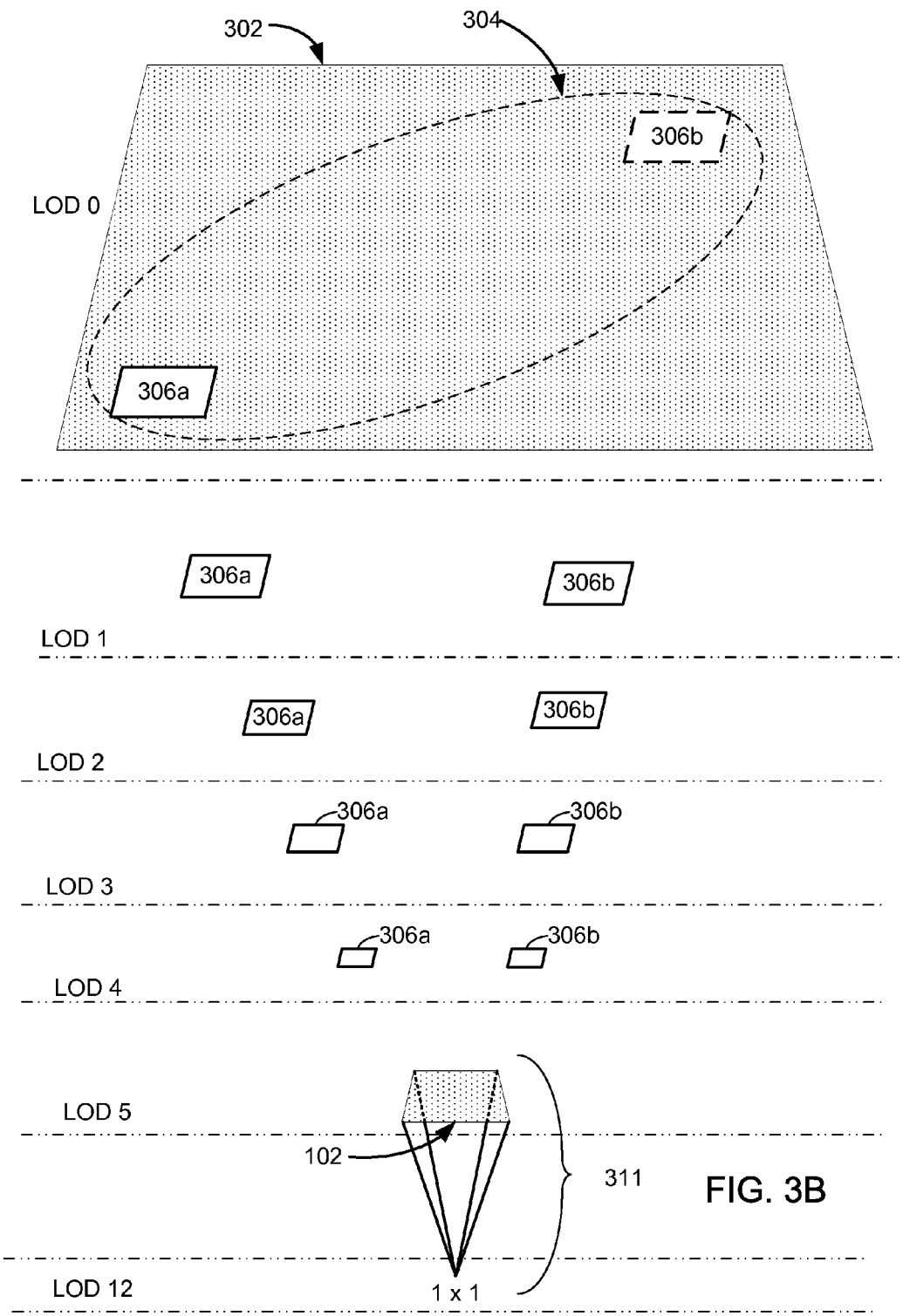

GPU TEXTURE TILE DETAIL CONTROL

BACKGROUND

Three-dimensional (3D) computer graphics systems, which can render objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing units (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "graphics pipeline," which may accept as input some representation of a 3D scene and output a 2D image for display. OpenGL® Application Programming Interface (API) and Direct3D® Application Programming Interface are two example APIs that have graphic pipeline models. The graphics pipeline typically includes a number of stages, one of which is texture mapping. Texture mapping allows detail, surface texture, or color to be added to fragments being rendered. In this process, a texture map is applied to the surface of a shape. In some systems, a texel (texture element or texture pixel) is the fundamental unit of texture space. When texturing a 3D surface, the texture mapping process maps texels to appropriate pixels in the output 2D image.

Processing the texture maps to produce the output 2D image consumes valuable GPU time. Therefore, techniques such a mipmapping have been developed. Mipmapping involves storing a texture map and several reduced level of detail (LOD) versions of the texture map. For example, maps with ¼ the detail of the original, 1/16 the detail, etc. may be stored in the texture memory. Mipmaps increase the efficiency of rendering by decreasing the workload on graphics pipeline stages. For example, if rendering the scene only requires a version of texture map that has little detail, then one of the less detailed maps can be accessed from texture memory rather than taking the time to filter a detailed version.

Typically, a limited amount of memory is used to store the texture map(s). Therefore, in some cases, the desired LOD of the texture might not be available in the texture memory. For example, the application (e.g., video game) might attempt to render with more detail than maps available in the texture memory. In this case, one option is to render the scene with less detail than desired. Alternatively, additional time might be consumed loading the desired LOD for the texture into texture memory. In some cases, there might not be any maps of the desired texture stored in texture memory. Therefore, the only practical option may be to take the time to load the texture into texture memory. Furthermore, since the size of the texture memory is limited, working with extremely large texture maps can be difficult.

SUMMARY

Systems and associated methods for processing textures in a graphical processing unit (GPU) are disclosed. Textures may be managed on a per region (e.g., tile) basis, which allows efficient use of texture memory. Moreover, very large textures may be used. Techniques provide for both texture streaming, as well as sparse textures. A GPU texture unit may be used to intelligently clamp LOD based on a shader specified value. The texture unit may provide feedback to the shader to allow the shader to react conditionally based on whether clamping was used, etc. Per-region (e.g., per-tile) independent mipmap stacks may be used to allow very large textures.

One embodiment includes a machine-implemented method comprising the following. A request for texels for a texture is received. The request includes a level of detail (LOD) threshold for one or more parts of the texture. A texture memory that stores tiles for the texture at different LODs is accessed. Texels are supplied based on tile LOD availability in the texture memory and the LOD threshold for the one or more parts of the texture. Supplying the texels includes clamping an LOD for a first of the tiles to an LOD that is no more than one level coarser than the requested LOD threshold for the part of the texture that corresponds to the first tile if the requested LOD for the first tile is not available in the texture memory.

One embodiment includes a system having a graphical processing unit (GPU) having circuitry configured to receive a request for texels for tiles that represent a texture. The request includes a per-tile level of detail (LOD) threshold, which specifies a requested LOD for each of the tiles. The circuitry is also configured to access a texture memory that stores the plurality of tiles at different levels of detail (LOD) and to supply texels for the plurality of tiles based on tile LOD availability in the texture memory and the per-tile level of detail (LOD) threshold for each of the tiles.

One embodiment includes machine-implemented method comprising accessing a clamp level of detail (LOD) for a plurality of tiles in a tile array that represents a texture, where the plurality of tiles represent less than the entire texture; storing, in a texture memory, a mipmap stack for each of the plurality of tiles, where the mipmap stack for each of the tiles is governed by the clamp LOD for that tile, and where less than the entire texture is actively stored in the texture memory; and storing, in the texture memory, a mipmap stack for the entire texture for any LODs with less detail than covered by the mipmap stacks for the plurality of tiles.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3B depicts an example in which different tiles have different clamps.

DETAILED DESCRIPTION

Embodiments in accordance with the disclosed technology include systems and methods for processing textures when rendering computer generated images. Textures may be managed on a per-region (e.g., per tile) basis, which allows efficient use of texture memory. Moreover, very large textures may be used. Techniques provide for both texture streaming (e.g., dynamically loading a manageable amount of needed texture data in a given period of time), as well as sparse textures (e.g., allowing statically determined levels of detail for texture by region). A GPU texture unit may be used to intelligently clamp LOD based on a shader specified value. The texture unit may provide feedback to the shader to allow the shader to react conditionally based on whether clamping was used, etc. Per-region (e.g., per-tile) independent mipmap stacks may be used to allow very large textures.

Figure 1:
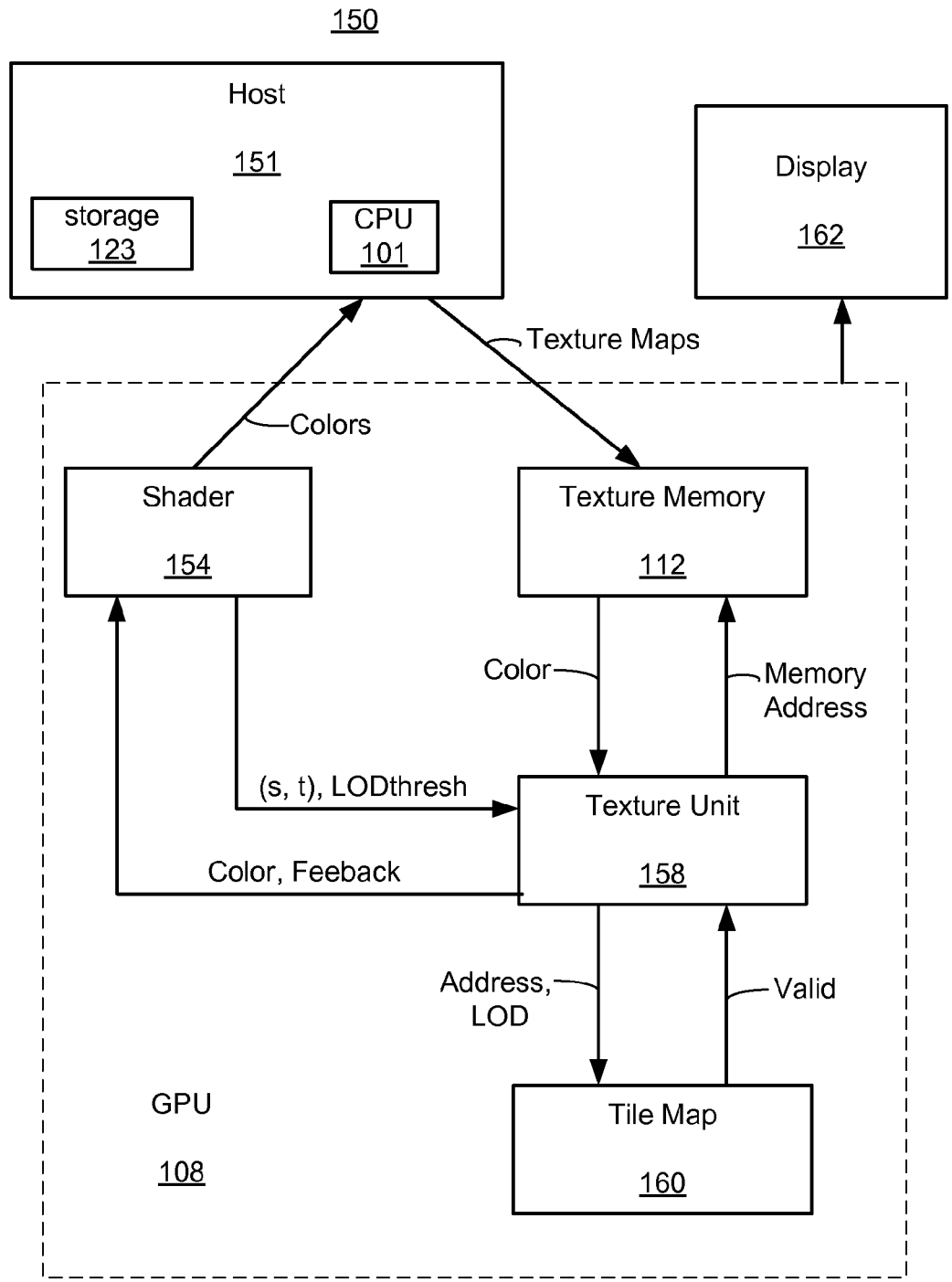
FIG. 1 depicts one embodiment of a system in which embodiments may be practiced.

FIG. 1 depicts one embodiment of a system 150 in which embodiments may be practiced. The system 150 includes host 151, shader 154, texture memory 112, texture unit 158, tile map 160, and display 162. The system 150 may be a part of a device such a gaming system, personal computer, etc. In some embodiments, the host 151 runs an application such as a video game. This application may run on a central processing unit (CPU) 101 of the host 151. At least some of the other components in FIG. 1 may be implemented in a graphical processing unit (GPU) 108 that is in communication with the CPU 101. The GPU 108 may or may not reside in the same device as the host 151. For example, the shader 154, texture memory 112, texture unit 158, and tile map 160 may be implemented in a GPU 108. The display 162 could be integrated in a device that houses the host 125 and/or GPU 108 or may be in a separate device.

Thus, the host 151 may control the content that is to be rendered on the display 162. The storage 123 on the host 151 may store the original texture data. Therefore, the host 151 may stream texture data into the texture memory 112 according to regions and LODs determined by the application. In one embodiment, the texture memory 112 serves as a "tile cache" that stores tiles that represent one or more textures to be used when rendering a frame or other element. A tile may be any region of a texture map. Texture memory 112 may be a type of digital storage that makes texture data readily available. The texture memory 112 may be implemented with specialized RAM that is designed for rapid reading and writing, enabling the graphics hardware increased performance in rendering 3D imagery; however, specialized RAM is not a requirement.

To obtain a color when rendering a pixel on the display 162, the host 151 may send a request to the shader 154. The shader 154 may be responsible for determining color for the pixel and returning the color value to the host 151. Thus, the shader 154 may be referred to as a "pixel shader." The shader 154 is not required to perform functions associated with vertex shaders or geometry shaders, but is not precluded from such functions. For example, the shader 154 could be a unified shader that functions as a pixel shader and a vertex shader and/or a geometry shader. The shader 154 may be implemented as a set of software instructions that are executed on one or more processors.

The shader 154 may send texture request to the texture unit 158. In some embodiments, the shader 154 specifies a texture and (s, t) coordinates. In some embodiments, the texture itself has (s, t) coordinates. Therefore, the request may be for for a color for some part of the texture, which may be referred to as a texel. In some embodiments, the texture is stored in the texture memory 112 in units referred to as tiles. In some embodiments, the shader 154 sends a per-tile LOD threshold value (LODthresh) to the texture unit 158 to specify a requested LOD for each tile. For example, LODthresh may be determined based on information about neighboring pixels in a triangle to be rendered. For example, if the pixels represent a small region, then there should be a high level of detail. On the other hand, if the pixels represent a large region, then there should be a low level of detail. Typically, a highest level of detail may be specified by "LOD 0", with lower levels of detail being specified by increasing numbers (e.g., LOD 1, LOD 2, etc.). Note that LODthresh is not required to be an integer. In some embodiments, the host 151 sends the LODthresh to the shader 154. In some embodiments, the shader 154 modifies LODthresh prior to sending to texture unit 158.

The tile map 160 may specify what tiles (and at what LOD) are stored in the texture memory 112. In one embodiment, the tile map 160 may contain one or more tables that can be used to determine what LOD (if any) is available for each tile. Thus, the tile map 160 may reside in a memory unit. In some embodiments, the tile map 160 resides in the texture memory 112; however, this is not required. The texture unit 158 may access the tile map 160 to determine whether requested tiles are in the texture memory 112. The tile map 160 responds by indicating whether there is valid data for the requested tiles at that LOD. The texture unit 112 may access the texture memory 112 and generate texels to respond to requests from the shader 154. The texture unit 158 may send an address (e.g., actual memory address) to the texture memory 112 and receive color values from the texture memory 112.

In some embodiments, the texture unit 112 clamps the LOD for tiles based on LODthresh and the tiles that are available in the texture memory 112. For example, if the shader 154 requests a LOD between LOD 1 and LOD 2 for a given tile, but the most detailed LOD that is available for the tile is LOD 2, then the texture unit 158 may clamp the LOD to LOD 2 and send a "warning feedback" to the shader 154 to indicate that the LOD was clamped to a slightly lower LOD than requested. The shader 154 might cause a more detailed LOD to be loaded into the texture memory 112 for that tile. In some embodiments, the texture unit 158 could send other feedback such as "OK," or "fail," depending on the availability in the texture memory 112 of the requested LOD. In some embodiments, the texture unit 158 is implemented in hardware to achieve fast processing. However, software implementations are not precluded.

Figure 2:
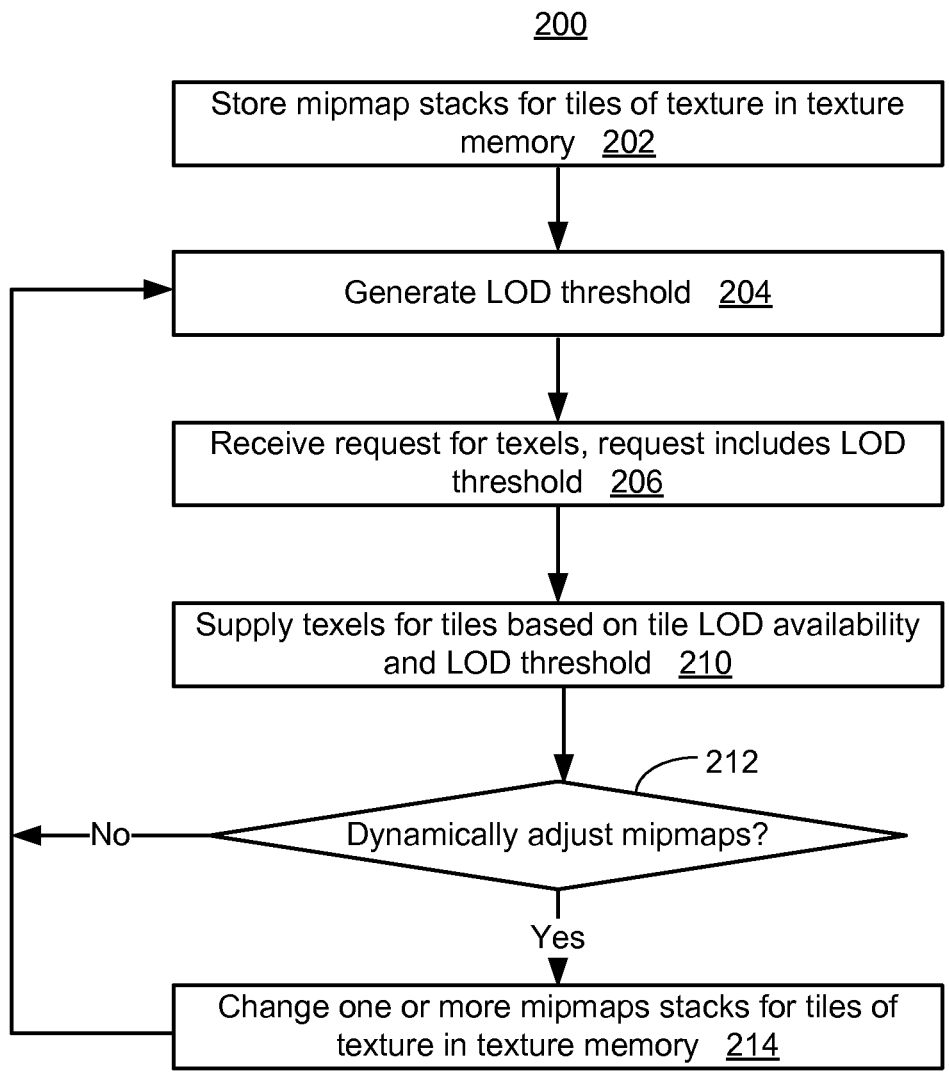
FIG. 2 is a flowchart illustrating one embodiment of a process of rendering computer generated images.

FIG. 2 is a flowchart illustrating one embodiment of a process 200 of rendering computer generated images. The process 200 may be performed within system 150. Note that in some embodiments, some steps may be performed by the host 151 and others by the GPU 108. In step 202, mipmap stacks for tiles of a texture are stored in texture memory 112. For example, an application such as a video game running on the host 151 loads texture maps into texture memory 112. In some embodiments, each tile in a tile array has its own mipmap stack, such that the most detailed LOD available may be different for different tiles. Further details are discussed below.

In step 204, an LODthresh value is generated. In some embodiments, the host 151 generates LODthresh. When the host 151 generates LODthresh it may be a single LODthresh for the entire texture, although varying the LODthresh by the host 151 for different parts of the texture is not precluded. For example, different (s, t) address ranges may have different values for LODthresh. In some embodiments, the shader 154 modifies LODthresh prior to sending to the texture unit 158. For example, the shader 154 may generate a per-tile LODthresh. In other words, different tiles may have a different value for LODthresh. Note that the shader 154 is not required to specify tiles to provide a per-tile LODthresh. Rather, the shader 154 may specify (s, t) addresses that the texture unit 158 converts to tile addresses. Therefore, the net affect may be that different tiles have different values for LODthresh. Further details of generating the LODthresh are discussed below.

In step 206, a request for texels is received by the texture unit 158. The request may include LODthresh and one or more (s, t) space addresses. The texture unit 158 may receive LODthresh from the shader 154 or directly from the host 102. Note that LODthresh that is provided to the texture unit 158 may actually specify an (s, t) space address (or some other address), as opposed to a specific tile.

In step 210, the texture unit 158 supplies texels for the tiles based on the LOD availability in the texture memory 112 and LODthresh for the tiles. In some embodiments, the texture unit 158 sends feedback to the shader 154 based on its ability to supply the requested LOD for each tile. In one embodiment, the texture unit 158 clamps the LOD for a given tile under certain conditions. For example, if the available LOD for a given tile is slightly below the requested LOD, the texture unit 158 may clamp to the available LOD. Further details of step 210 are discussed below. For example, FIG. 5 describes one embodiment.

In some embodiments, the content of the texture memory 112 may be dynamically updated. In step 212, a determination is made whether the texture memory 112 should be updated. For example, in response to receiving warning feedback, the shader 154 could suggest that the host 151 load additional texels to increase the LOD that is stored in texture memory 112 for a certain tile. If it is determined that the texture memory 112 should be dynamically updated, then one or more mipmap stacks for one or more tiles are changed, in step 214. Process 200 then continues with the host 151 or shader 154 sending additional requests for color values for texels. These requests may include the same or a different LODthresh. Therefore, one option is to generate a new LODthresh in step 204, although LODthresh may stay the same for the next request.

Figure 3A:
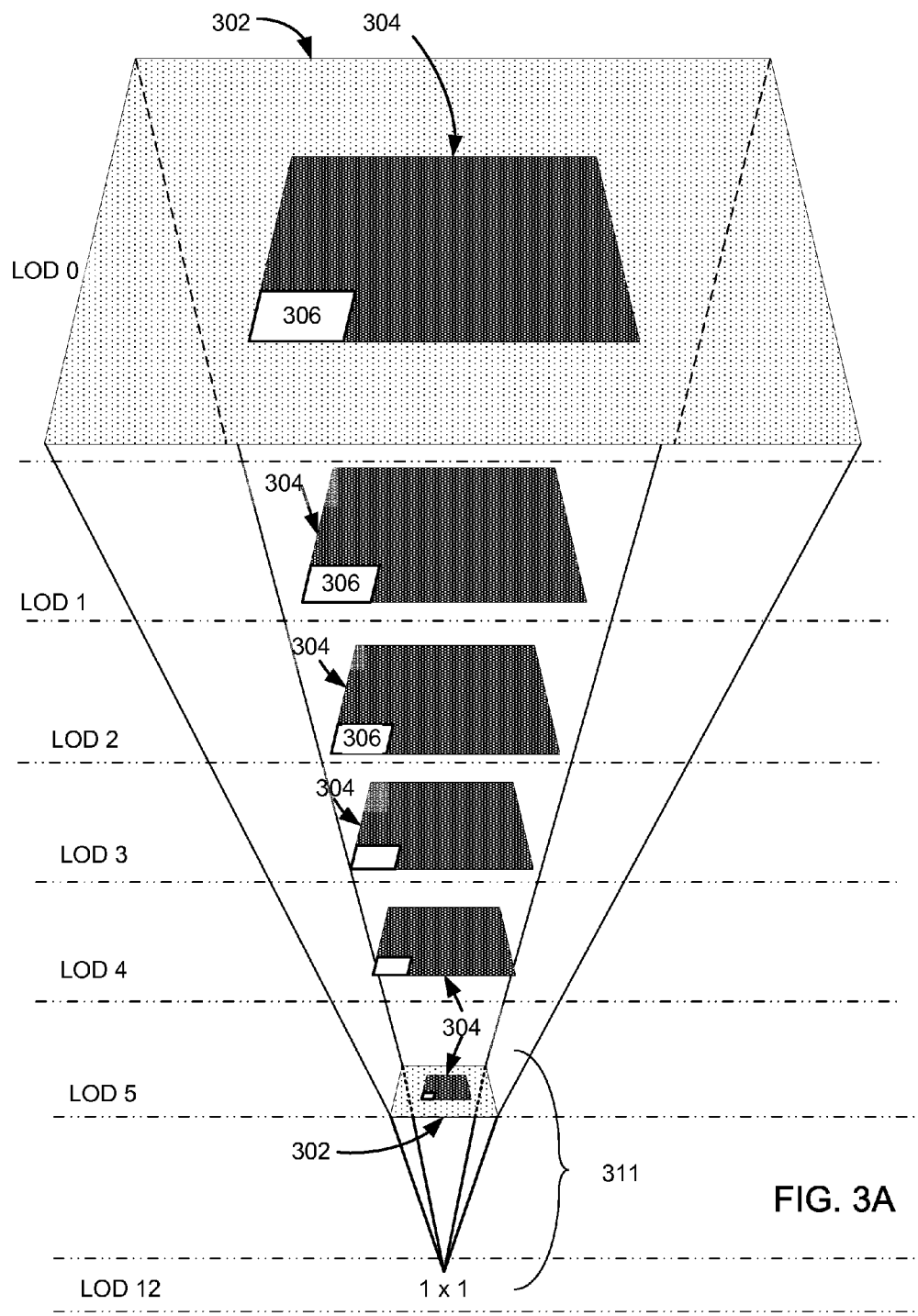
FIG. 3A shows an example used to illustrate one embodiment that may be used to implement independent mipmap stacks.

One embodiment includes per-region (e.g., per tile) independent mipmap stacks. Each mipmap stack may correspond to one element of a tile array. FIG. 3A shows an example used to illustrate one embodiment that may be used to implement independent mipmap stacks. The diagram is divided into levels that correspond to different levels of detail (LOD) and is used to illustrate a texture loaded into the texture memory 112. Virtual tile array 302 represents the entire texture, which may be divided into different regions referred to as tiles. As one example, the texture may be a 20×20 array of tiles. Typically, only portions of the entire virtual tile array 302 are loaded into texture memory 112 at one point in time, which is why it is referred to as a "virtual" tile array. In this example, a 6×6 "resident" tile array 304 at LOD 0 is loaded into texture memory 112. One tile 306 in the resident tile array 304 at LOD 0 is highlighted for purpose of discussion. The 6×6 resident tile array 304 is mipmapped down to LOD 4 in a single mipmap stack, in this example. Thus, full-detail and reduced-detail versions of the 6×6 resident tile array 304 are stored in texture memory 112. This is depicted in FIG. 3A by the 6×6 resident tile array 304 at LOD 1 through LOD 4.

The coarsest LODs—from LOD 5 through LOD 12—for the entire 20×20 virtual tile array 302 are stored in the texture memory 112, in this example. This is represented by mip tail array stack 311. Note that the using this technique allows very large textures to be stored in the texture memory 112, as the amount of memory that is required for the mip tail array stack 311 is not very much. Likewise, since at LOD 0 only a subset of tiles from the entire texture are stored (e.g., resident tile array 304), the amount of texture memory 112 used is not excessive. However, regardless what point in the texture is attempted to be accessed, it is guaranteed, in this embodiment, that some value can be returned, albeit at a coarser LOD in some cases.

For purposes of discussion the entire 20×20 virtual tile array might be a 5120×5120 byte texture. Thus, a given tile might be 256×256 bytes. At LOD 5, virtual tile array 302 may only be 160 bytes×160 bytes. Therefore, the top level of the mip tail array stack 311 may require less storage than a resident tile (e.g., the 306) at LOD 0. Note that the level at which the mip tail array stack 311 starts is for purposes of discussion. The mip tail array stack 311 may start at a higher or lower level than LOD 5.

Note that it is not required that all tiles in the resident tile array 304 be stored all the way up to LOD 0. In one embodiment, each tile in the tile array 304 may have its own clamp LOD. A clamp value refers to the most detailed LOD for a tile. FIG. 3B depicts an example in which different tiles have different clamps. For example, referring to FIG. 3B, tile 306a is clamped at LOD 0. Therefore, tile 306a has a version stored in texture memory 112 for LOD 0 through LOD 4. On the other hand, tile 306b is clamped at LOD 1. Therefore, there is a version of tile 306b stored in texture memory for LOD 1 through LOD 4 (but not at LOD 0). Having different clamp LODs for different tiles allows texture detail to be controlled statically. In some embodiments, the clamp LOD for each tile may be adjusted dynamically. Therefore, the texture detail may also be controlled dynamically.

Note that the resident tile array 304 is not required to be a contiguous region in the texture. For example, tile 306a and tile 306b may both be considered to be part of the resident tile array 304, as (some LOD version) of these tiles are resident in the texture memory 112. However, these tiles are not a part of the some contiguous region of the virtual array 302. Note that so as not to obscure the diagram other resident tiles of the resident tile array 304 are not depicted in FIG. 3B.

Moreover, note that resident tile array 304 could represent more than a single texture. Therefore, although only a single virtual tile array 302 is depicted in FIGS. 3A and 3B, note that there could be more than one virtual tile array 302. In such a case, the texture memory 112 may store a mip tail array stack 311 for each virtual tile array 302. For example, FIGS. 3A and 3B show mip tail array stack 311 starting at LOD 5 for the virtual tile array 302. The texture memory 112 could store more than one mip tail array stack 311, each corresponding to a different texture (or virtual tile array 302).

Figure 4:
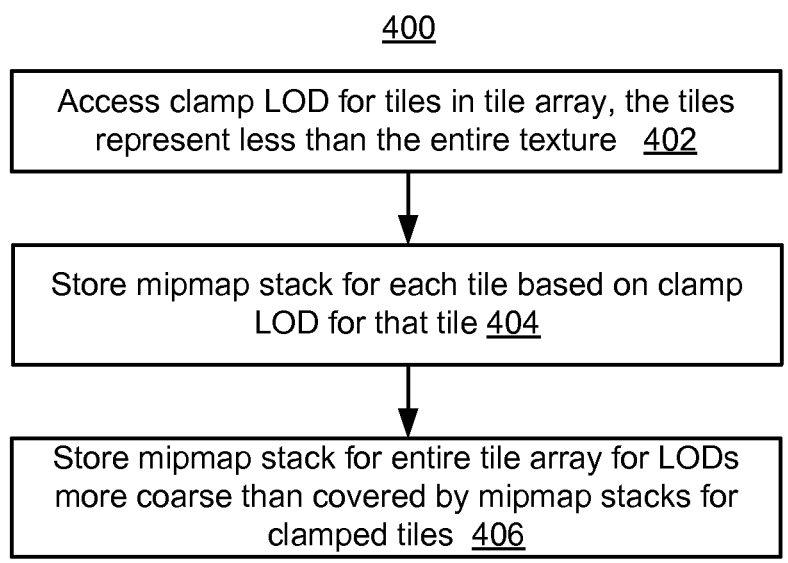
FIG. 4 is a flowchart of one embodiment of a process of storing mipmaps in the texture memory.

FIG. 4 is a flowchart of one embodiment of a process 400 of storing mipmaps in the texture memory 112. Process 400 is one embodiment of step 202 of process 200. In step 402, a clamp LOD is accessed for tiles in the resident tile array 304. The tiles represent a subset that is less than an entire texture.

As one example, the entire texture may be represented by 20×20 virtual tile array, with each tile being 256×256 bytes. Therefore, the entire texture might be 5120 bytes×5120 bytes. Also, as noted before, the resident tile array 304 could represent parts of more than one texture. Process 400 will be discussed with reference to a single texture, for convenience of discussion.

In step 404, mipmap stacks for each tile in the subset are stored in the texture memory 112. In step 406, a mipmap stack for the entire texture is stored in the texture memory 112. For example, mipmap stacks such as those depicted in FIG. 3A or 3B are stored in the texture memory 112. A shown in FIG. 3A, for example, there is a mipmap stack for each of the resident tiles in 6×6 tile region 304 and a mip tail array stack 311 for the entire texture.

Figure 5:
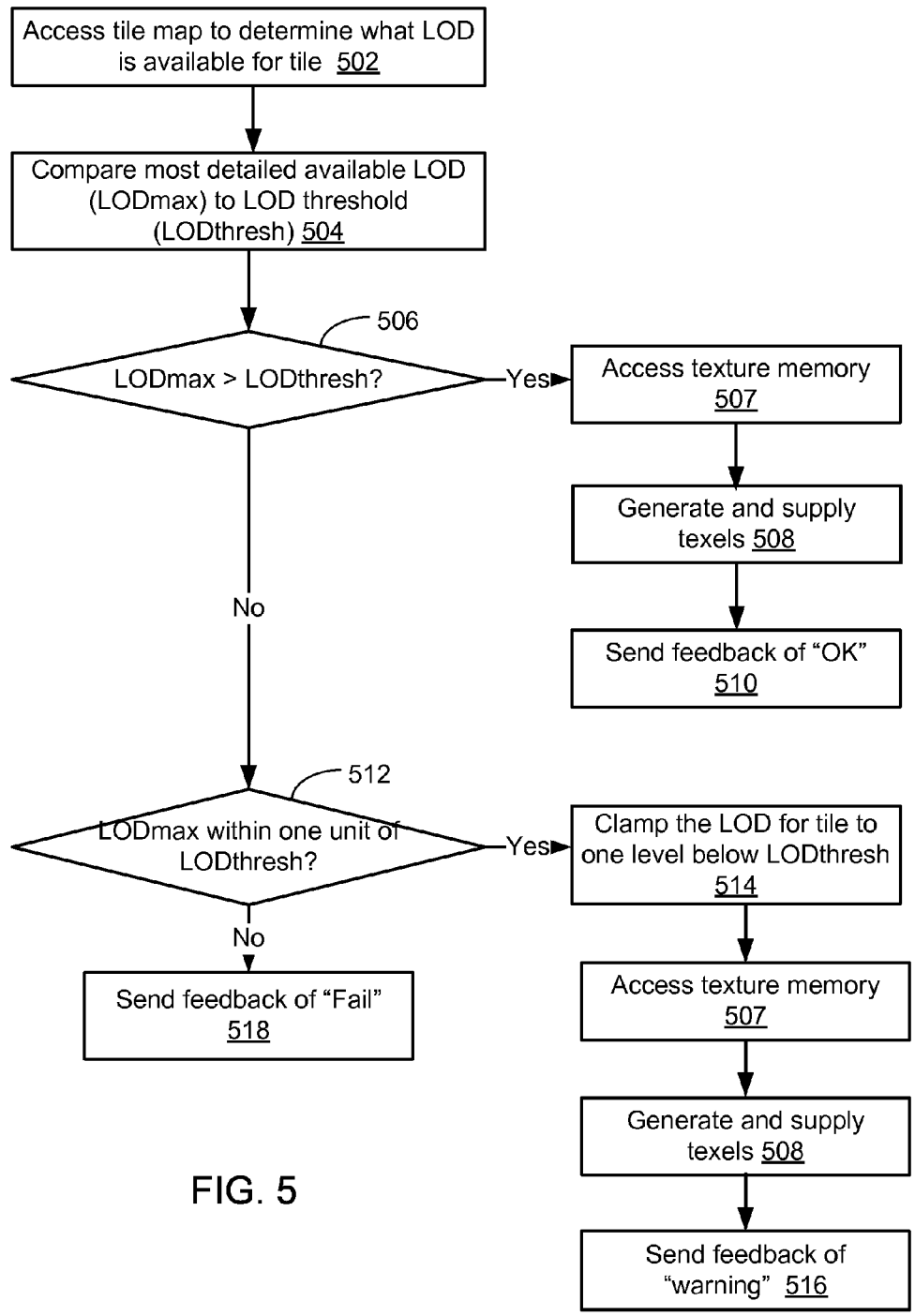
FIG. 5 is a flowchart of one embodiment of a process of providing texels.
Figure 6A:
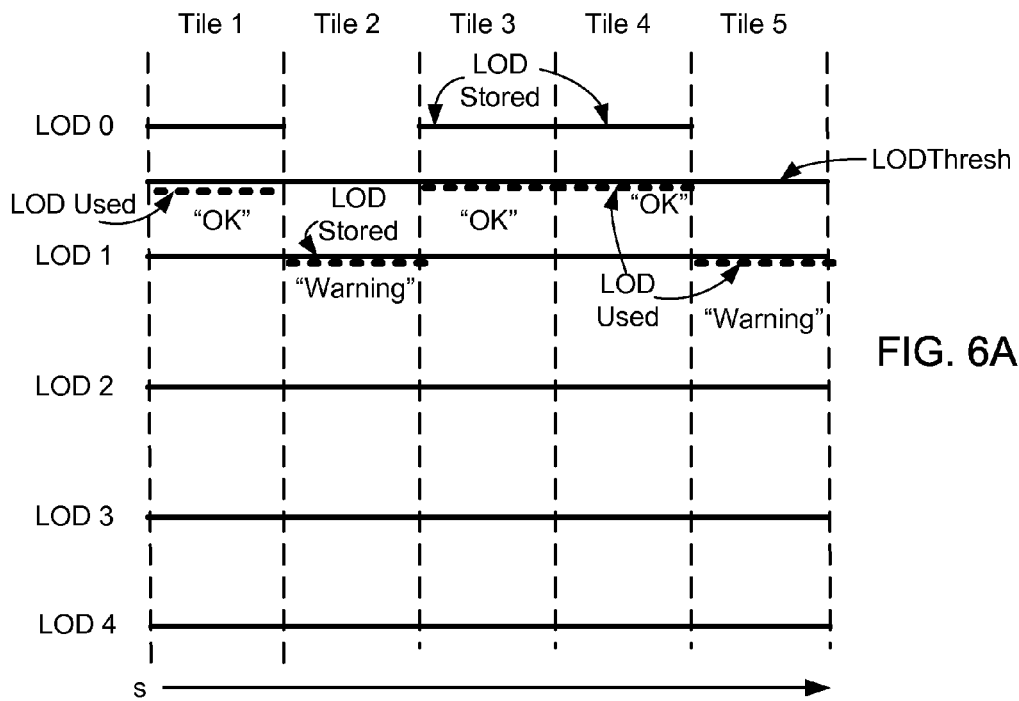
FIGS. 6A and 6B are diagrams that illustrate one embodiment of the texture unit 108 providing a suitable LOD for each tile.
Figure 6B:
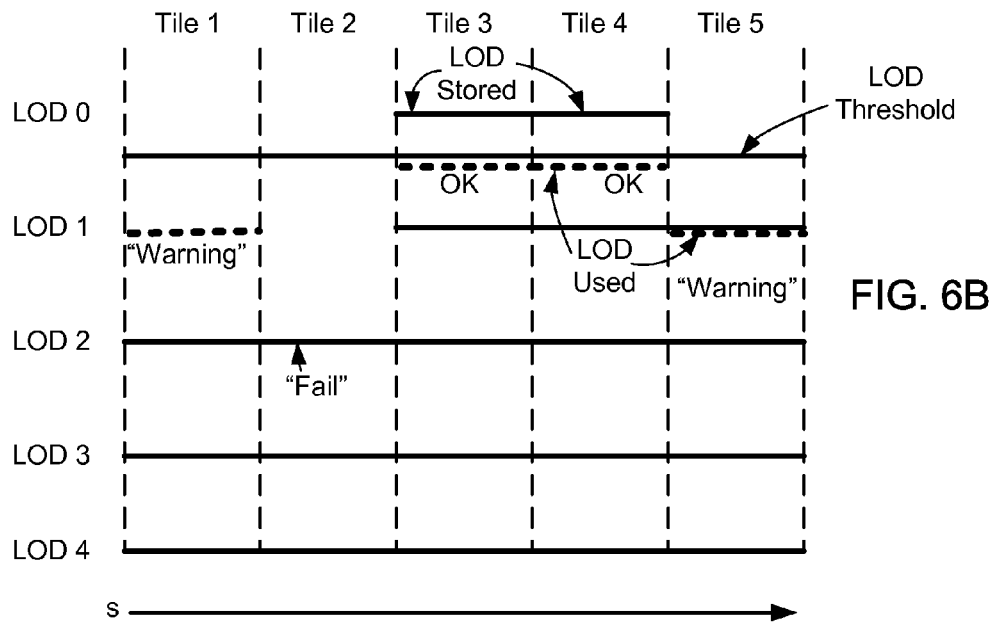

FIG. 5 is a flowchart of one embodiment of a process 500 of providing texels. Process 500 may be performed by the texture unit 158. Process 500 is one embodiment of step 210 of process 200. Thus, prior to process 500, the texture unit 158 has received the request for texels for at least one tile, along with LODthresh for the tile. Note that the request may specify an (s, t) address, which the texture unit 158 may convert to tile address. Process 500 describes processing for one tile. FIGS. 6A-6B will be referred to when discussing process 500. Briefly, FIGS. 6A and 6B are diagrams that illustrate one embodiment of the texture unit 158 providing a suitable LOD for each tile, as well as providing feedback to the shader 154. The diagrams in FIGS. 6A and 6B depict the available LOD that is stored in texture memory 112 for each of five adjacent tiles, an LOD threshold that may be provided by the shader 154, and an actual LOD that is supplied by the texture unit 158 to the shader 154 for each tile. The diagrams in FIGS. 6A and 6B also indicate the feedback provided by the texture unit 158 when providing texels for each tile.

In step 502 of process 500, the texture unit 158 accesses the tile map 160 to determine what LOD is available in the tile memory 112 for the requested tile. For example, the texture unit 158 converts an (s, t) address that was received from the shader 154 to an index in the virtual array 302 and then to an index in the resident tile array 304. Referring to the example of the 20×20 virtual tile array, the texture unit 158 might first identify which virtual tile corresponds to the (s, t) address. Next, the texture unit 158 may determine an index in the resident tile array 304 that corresponds to the virtual tile array index. In some embodiments, the texture unit 158 determines a physical address in the texture memory 112 based on the resident tile array index.

In step 504, the texture unit 158 compares the most detailed LOD available (LODmax) in the texture memory 112 for the requested tile to LODthresh. If LODmax is greater (more detailed) than LODthresh (step 506 is yes), then the texture unit 158 accesses the texture memory 112, in step 507. Then, the texture unit 158 generates and supplies texels for the tile in step 508. One way to generate the texel value for a given point is to determine the four nearest texels in the tile at LOD 0 to the requested (s, t) and form a first bilinear filtered value. A similar process can be performed for the tile at LOD 1 to form a second filtered value. These two values may then be combined based on using LODthresh to produce an interpolated value between LOD 0 and LOD 1. Other techniques can be used to form the final color value. The texture unit 158 sends a feedback to the shader 154 of "OK," in step 510.

Referring to FIG. 6A, for Tile 1, Tile 3, and Tile 4, LOD 0 through LOD 4 are stored in the texture memory 112. Note that FIG. 6A depicts an "s-axis" below the tiles to indicate the relationship between the "s-coordinate" of (s, t) space and the tiles. The "t-coordinate" is not explicitly depicted in FIG. 6A.

In this example, the LOD threshold (LODthresh) between LOD 0 and LOD 1. Thus, the texture unit 158 is able to provide values using the texture maps at LOD 0 and LOD 1. This is represented in FIG. 6A by the dashed line just below LODthresh labeled as "LOD used." In actuality the LOD used may be at essentially the same level as LODthresh, but is shown slightly below for purposes of illustration. Techniques that are known in the art for blending values from different texture maps may be used by the texture unit 158. Because the texture unit is able to provide values for all tiles that fully satisfy the requested LODthresh, the texture unit 158 sends feedback of "OK" to the shader 154 for Tile 1, Tile 3, and Tile 4.

Returning again to the discussion of FIG. 5, if the LODmax for the tile is not more detailed than the requested LODthresh (step 506 is no), then the texture unit 158 determines whether LODmax is within one level of LODthresh in step 512. If it is, then the texture unit 158 clamps the LOD for the tile to the integer level just below (i.e. coarser than) LODthresh in step 514. In other words, the texture unit 158 supplies texels that are slightly less detailed than requested. In step 516, the texture unit 158 send a feedback of "warning" to the shader 154 to indicate that the texture memory 112 does not currently have the LOD requested for the tile, but that the LOD is close.

Referring to FIG. 6A, for Tile 2 and Tile 5, LOD 1 through LOD 4 are stored in the texture memory 112, but LOD 0 is not. Thus, the texture unit 158 is not able to provide values that would correspond to a LOD between LOD 0 and LOD 1. However, the texture unit 158 is able to supply texels using the texture maps at LOD 1, which is within one level of the requested LODthresh. This is represented in FIG. 6A by the dashed line just below LOD 1 for Tile 2 and Tile 5. In actuality, the LOD used may be at essentially the same LOD 1, but is shown slightly below for purposes of illustration. Because the texture unit 158 is able to provide values within one level of the requested LODthresh, the texture unit 158 sends feedback of "warning" to the shader 154 for Tile 2 and Tile 5. Therefore, the shader 154 may take steps to cause a greater LOD to be loaded into the texture memory 158 for these tiles. Note that being within one level of LODthresh is used as one example, and that a being within some other number (possibly fractional value) of levels of LODthresh could be used.

Returning again to the discussion of FIG. 5, if the LODmax for the tile is not within one level of the requested LODthresh (step 512 is no), then the texture unit 158 sends feedback of "Fail", in step 518. Referring to FIG. 6B, for Tile 2, LOD 2 through LOD 4 are stored in the texture memory 112, but neither LOD 0 nor LOD 1 was requested. Thus, the texture unit 158 is not able to provide values within one level of the requested LODthresh based on the addresses provided. This is represented in FIG. 6B by having no dashed line for Tile 2. FIG. 6B also has the label "Fail" at LOD 2 for Tile 2 to indicate that LOD 2 is not detailed enough to use for texel generation, in this example.

Note that it is not required that the same LODthresh be used for all tiles. In one embodiment, the shader 154 sends a different LODthresh for different tiles. As noted above, the shader 154 may send LODthresh for (s, t) addresses, which the texture unit 158 converts to tiles. The shader 154 might send a single (e.g., constant) LODthresh for each tile or, alternatively, the shader 154 might send multiple values (e.g., a smooth value) for each tile. The diagram in FIGS. 6C and 6D will be used to illustrate embodiments in which the shader 154 sends a smoothed value. Those diagrams illustrate embodiments of step 202 of FIG. 2 of generating an LODthresh. In one embodiment, the shader 154 adjust the LODthresh based on the LOD that is actually available in the texture memory 112 for each tile.

Figure 6C:
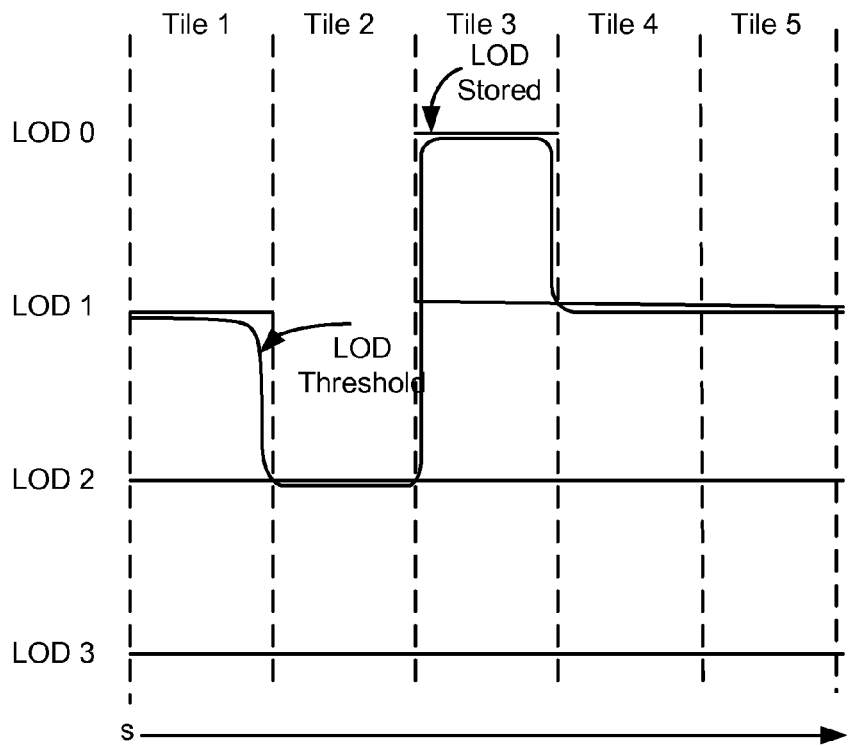
FIGS. 6C and 6D illustrate embodiments in which the shader sends a smoothed value of a LOD threshold.

As depicted in FIG. 6C, the LOD threshold is a smooth curve that has different values for different tiles. Moreover, for a single tile, the LOD threshold may smoothly change. For example, for Tile 1, the LOD threshold is just below LOD 1 for most of the tile; however, the LOD threshold smoothly drops down to LOD 2 at the rightmost portion of Tile 1. As can be seen, for Tile 2, LOD 2 is the greatest level of detail. Thus, the smooth LOD threshold curve provides a smooth transition between LOD 1 (used for most of tile 1) and LOD 2 (used for tile 2). As can be seen, the LOD threshold smoothly transitions to LOD 0 between Tile 2 and Tile 3. Then, the LOD threshold smoothly transitions from LOD 0 to LOD 1 between Tile 3 and Tile 4, where it remains.

In the embodiment depicted in FIG. 6C, the texture unit 158 is not required to send back feedback such as "OK" and "warning." The shader 154 may select suitable values for the LOD threshold based on knowledge of the most detailed LOD that is stored in texture memory 112 for each tile. Thus, the texture unit 112 may be able to always supply values that match the LOD threshold. In other words, the actual retuned values for the texels may have a LOD that exactly matches the LOD threshold.

Figure 6D:
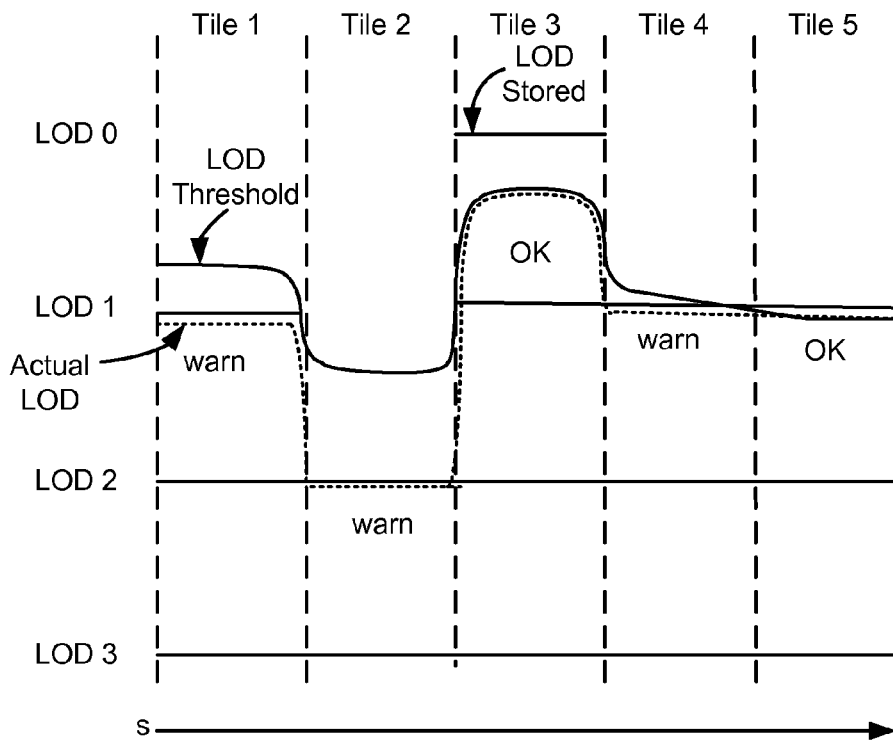

FIG. 6D is a diagram showing one embodiment with a variable LODthresh that is not necessarily a coarser LOD than is available in texture memory 112. In other words, there may or may not be an LOD in texture memory 112 that meets the LOD threshold. Therefore, the texture unit 158 may send feedback such as "OK," "warn," and "fail." For example, for Tile 1, the LOD threshold is between LOD 0 and LOD 1. However, for Tile 1, the most detailed LOD is LOD 1. Therefore, the texture unit 158 sends the shader 154 values ("actual LOD") that are at LOD 1. Also, the texture unit 158 may send a "warning" to the shader 154 to indicate that the LOD that is stored for Tile 1 is not as detailed as requested. Similarly, for Tile 2, the most detailed LOD (LOD 2) is less detailed than requested from the shader 154. Therefore, the texture unit 158 sends back an actual LOD that is at LOD 2, along with a warning that the most detailed LOD for Tile 2 is less detailed than requested. For Tile 3, there is an LOD that is at least as detailed as the requested LOD threshold. Therefore, the texture unit 158 sends an actual LOD that is at about the same level as the LOD threshold, along with an "OK" feedback. For Tile 4, the most detailed LOD available (LOD 1) is less detailed than the LOD threshold for at least part of the Tile. Note that LODthresh goes below LOD 1 for the rightmost portion of Tile 4 (referring to FIG. 6D). Thus, the texture unit 158 sends an actual LOD that at about LOD 1, along with a warning. For Tile 5, the texture unit 158 is able to send an actual LOD that meets the level of detail requested by the shader 154. Therefore, the texture unit 158 sends and "OK" feedback.

Figure 7:
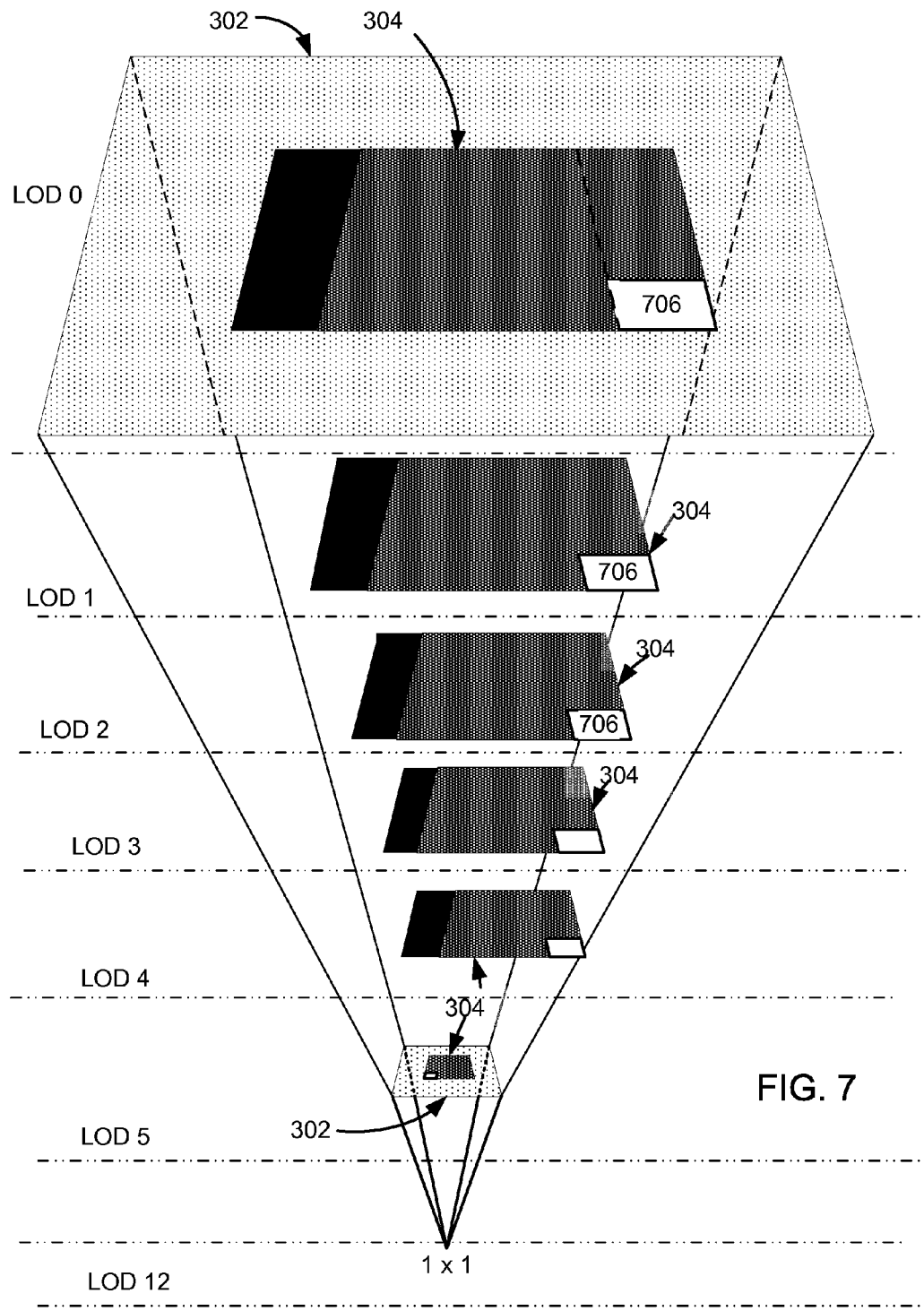
FIG. 7 depicts one embodiment of addressing.

One embodiment uses a replacement addressing when loading new data in the texture memory 112. FIG. 7 depicts one embodiment of replacement addressing. In particular, the resident tile array 304 depicted in FIG. 3A has been shifted in FIG. 7. In this embodiment, tiles that are no longer needed may be removed from texture memory 112 and replaced by other tiles. That is, the memory area formerly used can be re-used by the new tiles. In this example, at LOD 0, the six leftmost tiles in the 6×6 resident tile array 304 are removed from texture memory 112 and replaced by 6 tiles on the right side of the resident tile array 304. Tile 706 is depicted as one of the six newly added tiles. Similar replacements may be made at lower LODs for the 6×6 resident tile array 304. Thus, at LOD 1 through LOD 4, the resident tile array 304 is depicted as shifted in FIG. 7 as compared to FIG. 3A. Because the entire 20×20 tile array may be stored at LOD 5 through LOD 12, there is no shift for those LODs.

Note that the tiles that are replaced, as well as the tiles that are added could be entire mipmap stacks or particular LODs. For example, referring to FIG. 3B, the entire mipmap stack for 306a (from LOD 0 to LOD 4) could be removed. As another example, only LOD 0 and LOD 1 might be removed for tiles 306a, with LOD 2 through LOD 4 remaining. As still another example, a tile for 306b could be added at LOD 0.

Note that the resident tile array 304 is depicted as a contiguous region of the virtual tile array 302 as a matter of convenience. The actual new tiles that are added into the resident tile array 304 may be any tiles of the virtual tile array 302. Moreover, the tiles in the resident tile array 304 are not required to all be part of the same texture. Therefore, the new tiles in the resident tile array 304 could correspond to a different texture than the removed tiles. Also, the new tiles in the resident tile array 304 could correspond to a different texture than the other remaining tiles in the resident tile array 304.

In some embodiments, the texture unit 108 maintains pointers between a virtual tile array 302 and the resident tile array 304 to track what portions of virtual tile array 302 are stored in the resident tile array 304 and where they are stored. In one embodiment, addressing includes updating pointers for the virtual tiles that are removed and added to the resident tile array 304.

Some embodiments may include circuitry configured to instantiate specific aspects of the present disclosure. For example, the term circuitry used in the disclosure can include specialized hardware components configured to perform function(s) by firmware or switches. In other embodiments the term circuitry can include a general purpose processing unit, memory, etc., configured by software instructions that embody logic operable to perform function(s). In embodiments where circuitry includes a combination of hardware and software, an implementer may write source code embodying logic and the source code can be compiled into machine readable code that can be processed by the general purpose processing unit. The selection of hardware versus software to effectuate specific functions may be a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Herein, the term, "machine-implemented method" includes a method that is performed by software, hardware, or a combination of software and hardware. For example, some of the machine-implemented method may be performed by executing instructions on a processor, whereas some of the machine-implemented method may be performed without executing instructions on a processor.

Figure 8:
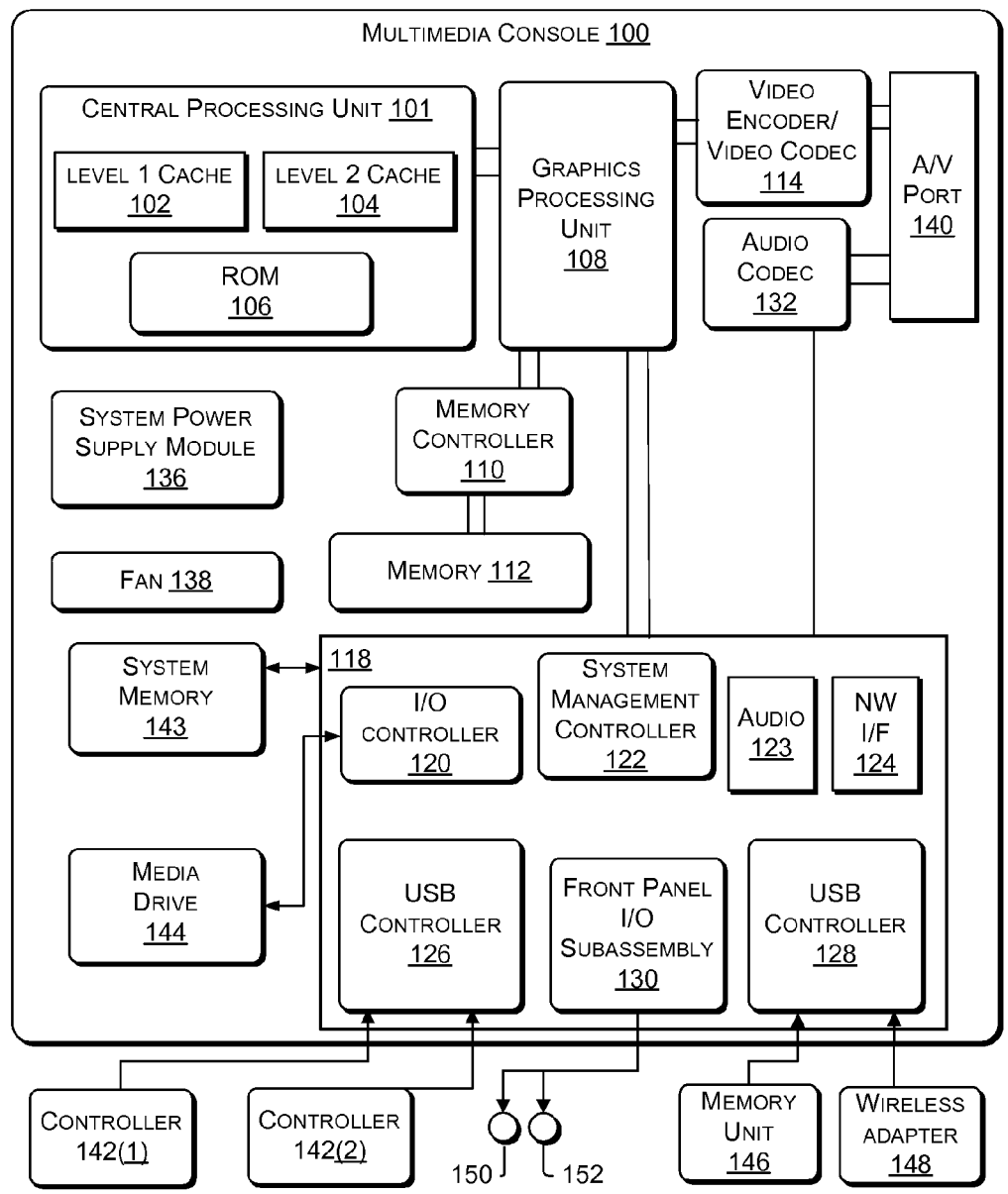
FIG. 8 depicts an example block diagram of a computing environment that may be used in the system of FIG. 1.

FIG. 8 depicts an example block diagram of a multimedia console 100 that may be used in the system of FIG. 1. The multimedia console 100 can be used to render computer generated images. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106, such as flash ROM, may store executable code that is loaded during an initial phase of a boot process when the multimedia console 100 is powered on. The application that renders the images may execute on the CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an AN (audio/video) port 140 for transmission to a television or other display. A memory controller 110 is connected to the GPU 108 to facilitate processor access to various types of memory 112, such as RAM (Random Access Memory). The GPU 108 may be used to implement the shader 104 and texture unit 108. Memory 112 may serve as texture memory 112. Thus, memory 112 may store the texture mipmaps. Memory 112 may also store the tile map 160.

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display (FIG. 1, 162). In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches.

Figure 9:
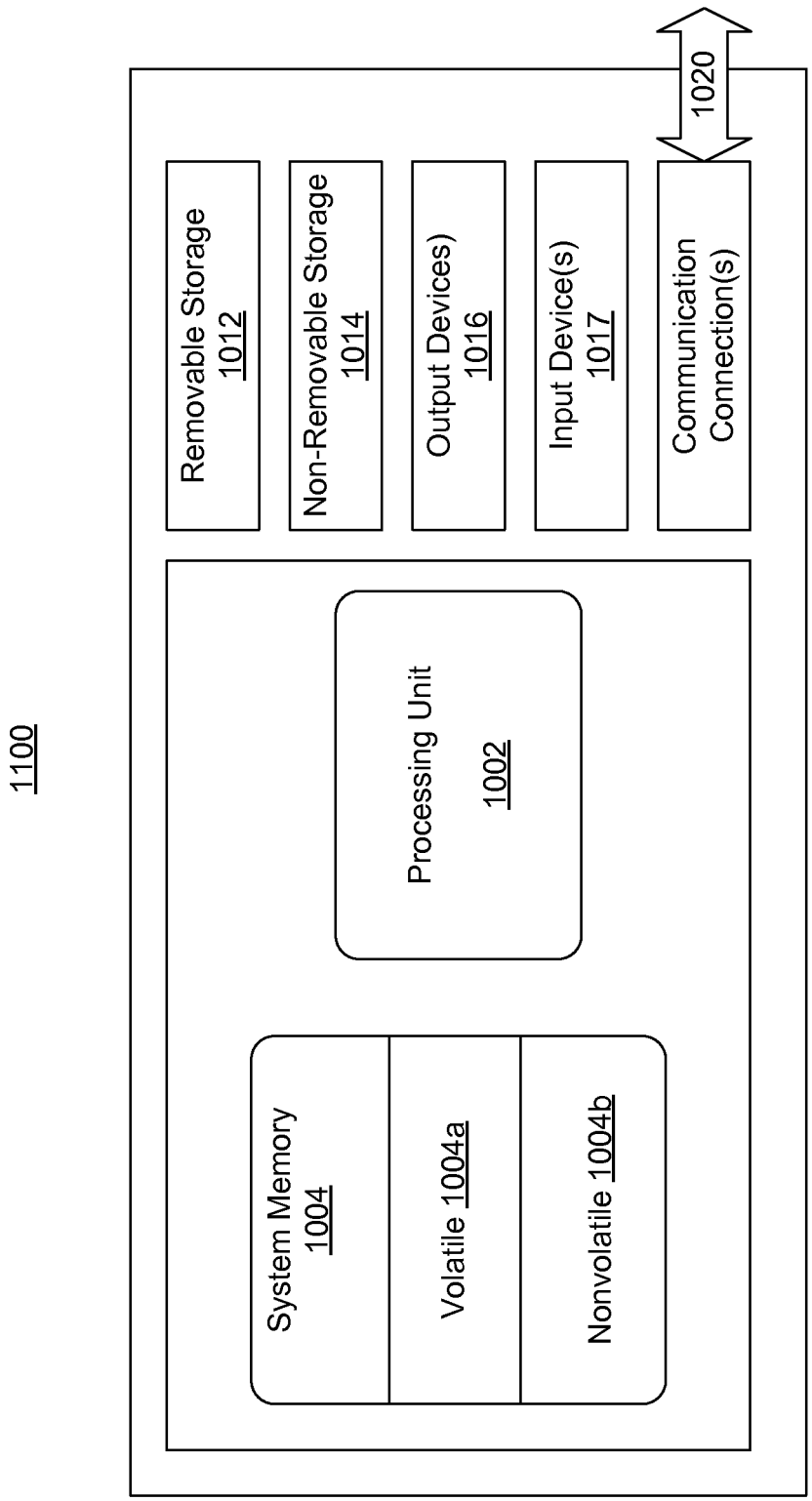
FIG. 9 is a block diagram of a computing system that can be used to implement components and perform methods of the disclosed technology.

With reference to FIG. 9, an exemplary system for implementing the various components of the described system and method may include a general purpose computing device in the form of a computer 1100. Computing device may be used to implement all or a portion of system 150, for example. The computing device 1100 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system.

In its most basic configuration, the computer 1000 typically includes a processing unit 1002 and memory 1004. In this example, processing unit 1002 may serve as both a CPU to run a host application, as well as a GPU to render images. The texture maps and tile maps may be stored in memory 1004. Pending on the exact configuration and type of computing device, memory 1004 may be volatile 1004*a* (such as RAM), non-volatile 1004*b* (such as ROM, flash memory, etc.) or some combination of the two. Additionally, computer 1000 may also have mass storage (removable 1012 and/or non-removable 1014) such as magnetic or optical disks or tape.

Similarly, computer 1000 may also have input devices 1017 and/or output devices 1016, such as a display (FIG. 1, 162). Other aspects of device 1000 may include communication connections 1020 to other devices, computers, networks, servers, etc. using either wired or wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A machine-implemented method comprising:
   receiving a request for texels of a texture at a texture unit from a requestor, the request includes a level of detail (LOD) threshold for one or more parts of the texture;
   accessing a texture memory that stores a plurality of tiles for the texture at different LODs;
   supplying texels for the texture based on tile LOD availability in the texture memory and the LOD threshold for the one or more parts of the texture, the supplying includes clamping an LOD for any tiles for which the greatest LOD available in the texture memory is within a pre-defiined value of the LOD threshhold to an LOD that is no more than the pre-defined value coarser than the requested LOD threshold, the clamping the LOD is performed by the texture unit;
   sending an "OK" feedback from the texture unit to the requestor for any tiles that were supplied without being clamped;
   sending a warning from the texture unit to the requestor that the LOD was clamped to an LOD that is no more than the pre-defined value coarser than the requested LOD threshold for any tiles that were clamped; and
   sending a feedback of fail to the requestor for any tiles for which the most detailed LOD in the texture memory is not within the pre-defined value of the LOD threshold.

2. The machine implemented method of claim 1, further comprising:
   generating, by a shader, the LOD threshold for the one or more parts of the texture, the generating includes generating a plurality of values for the LOD threshold for parts of the texture that correspond to a first tile; and
   providing the LOD threshold for the one or more parts of the texture in the request for texels to the texture unit.

3. The machine implemented method of claim 2, wherein:
   the generating the LOD threshold for the one or more parts of the texture includes generating a curve for the LOD threshold having a smooth transition between the first tile and a second of the tiles, the second tile having an average LOD threshold that is different from an average LOD threshold for the first tile.

4. The machine implemented method of claim 3, wherein the LOD threshold for the first tile and the LOD threshold for the second tile have the same value at a transition from the first tile to the second tile.

5. The machine implemented method of claim 1, further comprising:
   generating the LOD threshold for the one or more parts of the texture, the generating includes generating the LOD threshold for the one or more parts of the texture based on LOD availability in the texture memory for each of the tiles; and
   providing the LOD threshold for the one or more parts of the texture in the request for texels.

6. The machine implemented method of claim 1, further comprising:
   accessing a clamp level of detail (LOD) for a subset of the tiles in the texture;
   storing, in the texture memory, a mipmap stack for each tile in the subset, the mipmap stack for each tile corresponds to the clamp LOD for that tile; and
   storing, in the texture memory, a mipmap stack for the entire texture for at least any LODs with less detail than covered by the mipmap stacks for the subset of tiles.

7. A system comprising:
   a graphical processing unit (GPU) having circuitry configured to:
   receive a request from a requestor for texels for a plurality of tiles that represent a texture, the request includes a per-tile level of detail (LOD) threshold for each of the tiles that represent the texture, the per-tile level of detail (LOD) threshold specifies a requested LOD for each of the tiles that represent a texture;
   access a texture memory that stores the plurality of tiles at different levels of detail (LOD);
   supply texels for any tiles that represent the texture that have a tile LOD availability in the texture memory that meets the requested LOD for the respective tile with an "OK" feedback;
   clamp the LOD and supply texels for any tiles that represent the texture to an LOD that is no more than a pre-defined level or fraction of a level coarser than the requested LOD for any tiles for which the LOD threshold available in the texture memory for that respective tile is within the pre-defined level or fraction of a level coarser than the requested LOD for that tile, the clamping performed by texture unit;
   send a warning from the texture unit to the requestor that the LOD was clamped to an LOD that is no more than the pre-defined level or fraction of a level coarser than the requested LOD for the respective tile if the tile was clamped; and
   send a feedback of fail to the requestor for any tiles that represent the texture for which the most detailed LOD in the texture memory is not within the pre-defined level or fraction of a level coarser than the requested LOD for the respective tile.

8. The system of claim 7, wherein the circuitry is further configured to:

generate the per-tile level of detail (LOD) threshold for each of the tiles that represent a texture, the generating includes generating a plurality of values for the LOD threshold for a first of the tiles; and provide the per-tile level of detail (LOD) threshold for each of the tiles that represent a texture in the request for texels.

9. The system of claim 8, wherein the circuitry configured to generate the per-tile level of detail (LOD) threshold for each of the tiles is further configured to generate a smooth curve.

10. The system of claim 8, wherein:

the generating the per-tile level of detail (LOD) threshold for each of the tiles includes generating a curve for the LOD threshold having a smooth transition between the first tile and a second of the tiles, the second tile having an average LOD threshold that is different from an average LOD value for the first tile.

11. The system of claim 10, wherein the LOD threshold for the first the and the LOD threshold for the second tile have the same value at a transition from the first tile to the second tile.

12. The system of claim 7, wherein the circuitry of the GPU is further configured to:

generate the per-tile level of detail (LOD) threshold for each of the tiles, the generating includes generating the LOD threshold for each of the tiles based on LOD availability in the texture memory for each of the tiles; and provide the per-tile level of detail (LOD) threshold for each of the tiles in the request for texels.

13. A machine-implemented method comprising:

accessing a plurality of clamp level of details (LOD) for each of a corresponding plurality of tiles in a tile array that represents a texture, the plurality of tiles represent less than the entire texture;

storing, in a texture memory, a mipmap stack for each of the plurality of tiles, the mipmap stack for each of the tiles is governed by the clamp LOD for that corresponding tile, less than the entire texture is actively stored in the texture memory;

storing, in the texture memory, a mipmap stack for the entire texture for any LODs with less detail than covered by the mipmap stacks for the plurality of tiles;

receiving a request for texels of the texture at a texture unit from a requestor, the request includes a level of detail (LOD) threshold for one or more parts of the texture;

accessing the texture memory in response to the request;

supplying texels for the texture based on tile LOD availability in the texture memory and the LOD threshold for the one or more parts of the texture, the supplying includes clamping an LOD for any tiles for which the greatest LOD available in the texture memory is within a pre-defined value of the LOD threshold to an LOD that is no more than the pre-defined value coarser than the requested LOD threshold, the clamping the LOD is performed by the texture unit;

sending an "OK" feedback from the texture unit to the requestor for any tiles that were supplied without being clamped;

sending a warning feedback from the texture unit to the requestor that the LOD was clamped to an LOD that is no more than the pre-defined value coarser than the requested LOD threshold for any tiles that were clamped; and sending a feedback of fail to the requestor for any tiles for which the most detailed LOD in the texture memory is not within the pre-defined value of the LOD threshold.

14. The machine-implemented method of claim 13, further comprising:

sending a request to change the clamp LOD for a first of the tiles based on the OK feedback, warning feedback, and fail feedback from the texture unit; and modifying the mipmap stack that is stored in the texture memory in response to receiving the request to change the clamp LOD for the first tile.

15. The machine-implemented method of claim 13, further comprising:

removing a first set of the tiles from the texture memory, the first set stored in a first area of the texture memory; and adding a second set of the tiles to the texture memory, the second set is added to the first area.

16. The machine-implemented method of claim 15, further comprising updating pointers in response to removing the first set of the tiles and adding the second set of the tiles.

* * * * *